(12) United States Patent
Moppett et al.

(10) Patent No.: US 8,613,966 B2
(45) Date of Patent: Dec. 24, 2013

(54) WAFER

(75) Inventors: Garry Dean Moppett, Windsor (GB); Nicos Charalambous, Reading (GB); Will Robert MacKay Taylor, Reading (GB); Peter Andrew Clarke, Burnham (GB)

(73) Assignee: Mars, Incorporated, McLean, VA (US)

( * ) Notice: Subject to any disclaimer, the term of this patent is extended or adjusted under 35 U.S.C. 154(b) by 1430 days.

(21) Appl. No.: 10/541,302

(22) PCT Filed: Jan. 7, 2004

(86) PCT No.: PCT/GB2004/000028
§ 371 (c)(1),
(2), (4) Date: Dec. 14, 2006

(87) PCT Pub. No.: WO2004/062374
PCT Pub. Date: Jul. 29, 2004

(65) Prior Publication Data
US 2007/0166434 A1    Jul. 19, 2007

(30) Foreign Application Priority Data
Jan. 10, 2003 (GB) .................................. 0300569.1

(51) Int. Cl.
*A21D 13/00* (2006.01)
(52) U.S. Cl.
USPC .............. 426/94; 426/245; 426/572; 426/502

(58) Field of Classification Search
USPC ................................................... 426/104, 94
See application file for complete search history.

(56) References Cited

U.S. PATENT DOCUMENTS

| | | | |
|---|---|---|---|
| 3,956,517 A | 5/1976 | Curry et al. | 426/502 |
| 3,973,044 A * | 8/1976 | Giddey et al. | 426/104 |
| 4,508,739 A | 4/1985 | Ryan | 426/144 |
| 4,973,481 A | 11/1990 | Dayley et al. | 426/144 |
| 5,419,903 A | 5/1995 | Evans | 426/144 |
| 2004/0000543 A1 * | 1/2004 | Dudek et al. | 219/655 |

FOREIGN PATENT DOCUMENTS

| | | |
|---|---|---|
| GB | 2128130 | 4/1984 |
| GB | 2316852 | 3/1998 |
| WO | 95/08268 | 3/1995 |
| WO | 03/005832 | 1/2003 |

* cited by examiner

*Primary Examiner* — Patricia George
(74) *Attorney, Agent, or Firm* — Mars, Incorporated; Colleen Kramer

(57) ABSTRACT

A rippled wafer (90) formed of a convoluted wafer ribbon (80), the rippled wafer (90) having an average of at least 12 turns/cm$^2$, wherein a turn is a change in direction of the wafer ribbon (80) of at least 45°, and a confectionery product comprising such a wafer. Also a confectionery product comprising a rippled wafer (90) formed of a convoluted wafer ribbon (80), wherein the turns are substantially uniformly distributed across the cross section of the rippled wafer, where a turn is a change in direction of the wafer ribbon of at least 45°, and a confectionery product comprising a three-dimensional rippled wafer (90) formed in a single step.

22 Claims, 6 Drawing Sheets

WAFER

The invention relates to a rippled wafer and to a confectionery product comprising a rippled wafer.

Edible baked wafers are known in the art. For example, WO 98/25474 discloses a method and device for producing wafer rolls in which an endless wafer strip made of a sugar based wafer dough is baked on a rotating baking surface and then wound around a rotating mandrel to produce a continuous overlapping wafer tube. The tube is then cut into sections which are cooled to produce individual hard, cylindrical wafer rolls having a characteristic "snap" when consumed. Another type of known wafer is formed by stacking individual sheets of baked wafer together with a cream or other adhesive to form a three-dimensional book wafer. Fan-shaped ice cream wafers formed from baked wafer sheets are also known. Such wafers are commonly corrugated, the corrugations being formed by compressing the sheet after baking while it is still flexible. Another type of known wafer is formed by cutting pieces of baked wafer into discrete lengths or strips which are rolled into a loose tube. The loose tubes may be flattened to form flattened rolled wafers or flattened and folded in upon themselves to form folded convoluted wafers. Confectionery products incorporating such wafers are also known.

According to a first aspect of the present invention there is provided a rippled wafer formed of a convoluted wafer ribbon, the rippled wafer having an average of at least 12 turns/cm$^2$, a turn being as defined below.

The term rippled wafer is used throughout the specification to mean a wafer comprising a plurality of non-concentric convolutions.

The term turn is used here to mean a change in direction of the wafer ribbon of at least 45°, more preferably at least 90°, most preferably at least 135°.

Preferably, the average number of turns/cm$^2$ is at least 15, more preferably at least 20, most preferably at least 25.

In contrast to the rippled wafers of the present invention, the known folded convoluted wafers described above are comprised mainly of flat or straight portions of wafer ribbon with relatively few turns.

Preferably, the rippled wafer has a ratio of cross sectional edge length, as defined below, to average cross sectional area of greater than $2/r_e$, as defined below.

More preferably, the rippled wafer has a ratio of cross sectional edge length to average cross sectional area of at least $4/r_e$.

The cross sectional edge length, as used in this specification, is defined as the length of the cut edges exposed by a cross sectional cut through the formed wafer, perpendicular to the principal axis of the wafer or the length of the exposed edges at either end of the formed wafer. Where one or more layers of wafer are in intimate contact, the exposed edge contributes once only to the cross sectional edge length for so long as they are in intimate contact.

The cross sectional edge length and average number of turns in a given cross sectional area gives an indication of the degree of convolution of the formed wafer.

In a conventional cylindrical rolled wafer, the cross sectional edge length is substantially the circumference of the formed wafer, that is the cross sectional edge length equals $2\pi r$ where r is the radius of the cylinder. A typical value for the cross sectional edge length to average cross sectional area ($\pi r^2$), ratio for such a wafer is, therefore, $2/r$.

The maximum value of the cross sectional edge length is the length of the wafer ribbon forming the wafer. In the rippled wafers of the present invention, the cross sectional edge length approaches this value. In the known folded convoluted wafers described above, the cross sectional edge length is significantly less than the theoretical maximum.

The average cross sectional area of a formed wafer is obtained by measuring the volume of the formed wafer (rather than the volume of the wafer ribbon in the formed wafer) and dividing this by the length of the formed wafer.

The rippled wafers of the present invention need not be circular in cross section. The average cross sectional area of the rippled wafers may be considered to be equivalent to that of a circle having a radius $r_e$, where $r_e$ equals (average cross sectional area/$\pi$)$^{1/2}$. For the rippled wafers of the invention $r_e$ is typically between about 5 mm and about 10 mm.

According to a second aspect of the present invention there is provided a confectionery product comprising a rippled wafer formed of a convoluted wafer ribbon, wherein the turns are substantially uniformly distributed across the cross section of the rippled wafer, where a turn is a change in direction of the wafer ribbon of at least 45°.

According to a third aspect of the present invention there is provided a confectionery product comprising a three-dimensional rippled wafer formed in a single step. Preferably, the rippled wafer has a ratio of cross sectional edge length to average cross sectional area of greater than $2/r_e$.

More preferably the rippled wafer has a ratio of cross sectional edge length to average cross sectional area of at least $4/r_e$.

The invention also provides a confectionery product comprising a rippled wafer according to the invention.

Preferably the confectionery product further comprises a soft layer at least partly surrounding the rippled wafer and a hard shell. Preferably the soft layer is a fat-based cream.

The hard shell may be a sugar based shell or other hard coating employed in confectionery products such as a caramel or toffee coating. Preferably the hard shell is chocolate.

The fat-based cream may be any cream employed in confectionery products such as a chocolate cream or a caramel cream.

Confectionery products according to the invention can be made to emulate or incorporate the taste attributes of conventional chocolate bars. However, the inclusion of low density, low satiating rippled wafers which melt away quickly with no tooth-packing and no hard "snap" in confectionery products according to the invention delivers textural lightness and variation not found in known confectionery products.

The rippled wafers of the invention may constitute a major or minor component of the confectionery product.

The known three-dimensional book wafers described above comprise a plurality of flat layers of wafer separated by layers of cream. In contrast, rippled wafers according to the present invention comprise a plurality of convolutions separated by air pockets. Confectionery products comprising rippled wafers according to the invention at least partly surrounded by a cream deliver a texture not found in known confectionery products comprising book wafers.

The production of known three-dimensional book wafers involves a series of steps during which cream and/or wafer may be lost. When manufacturing such book wafers it is also difficult to apply an even layer of cream between the wafer layers. The three-dimensional rippled wafers of the present invention are, in contrast, formed in a single processing step.

The invention will now be further described, by way of example, with reference to the accompanying drawings, in which.

Figure 1:
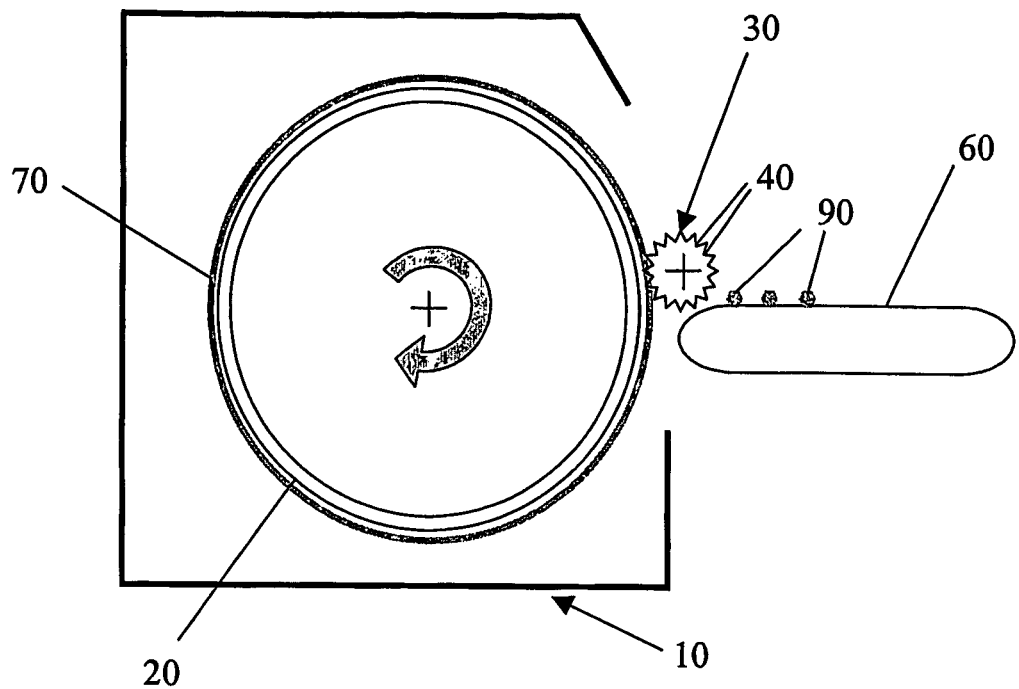
FIG. 1 is a schematic view of apparatus for the production of a rippled wafer of the invention.
Figure 2:
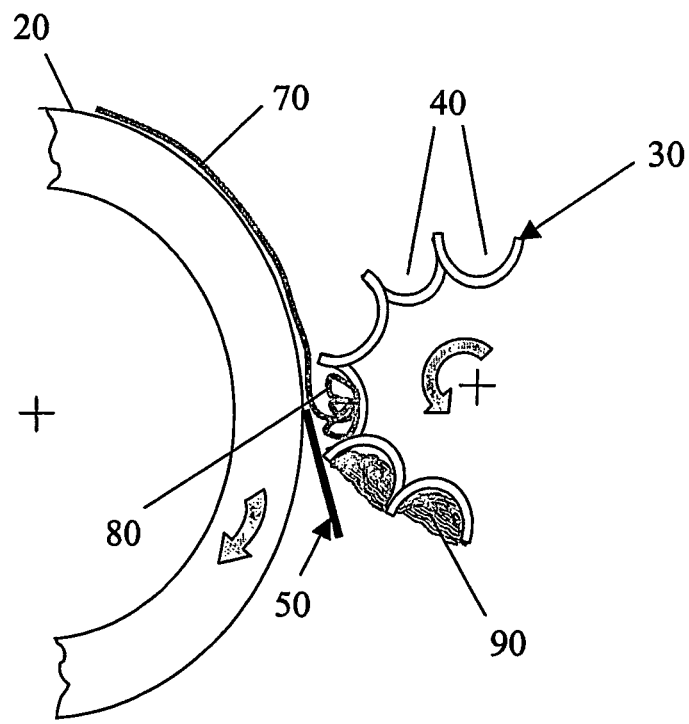
FIG. 2 shows an enlarged schematic view of a part of the rotary forming unit of FIG. 1.
Figure 3:
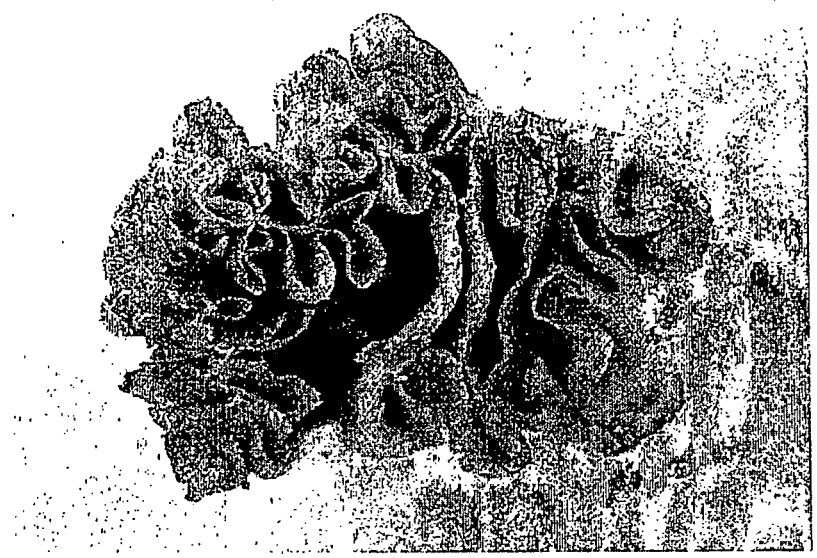
FIG. 3 shows an end view of a rippled wafer produced using the apparatus shown in FIGS. 1 and 2.
Figure 4:
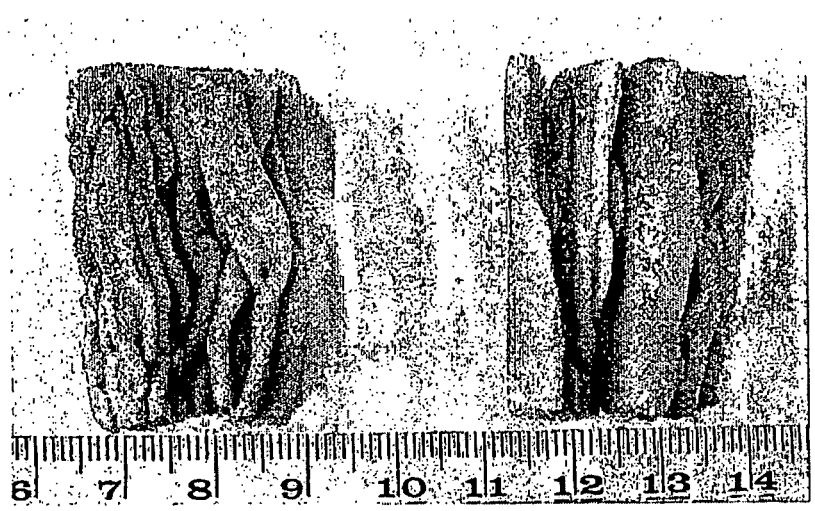
FIG. 4 shows a plan view of the rippled wafer of FIG. 3.
Figure 5:
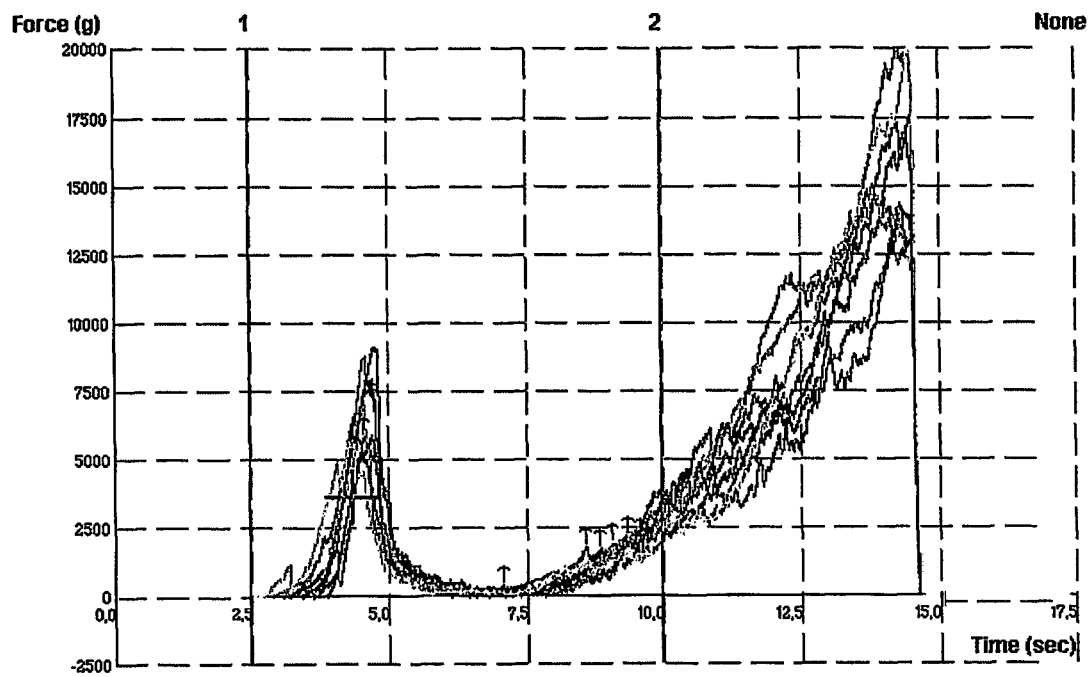
FIG. 5 is a graph showing the results of compression tests on a known cylindrical rolled wafer.
Figure 6:
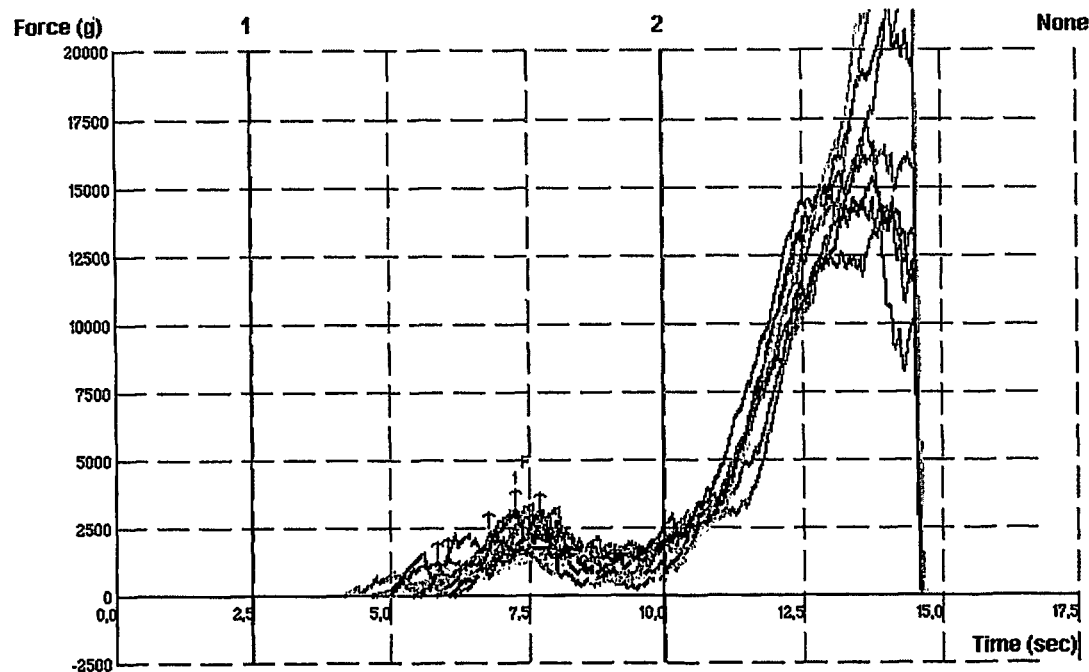
FIG. 6 is a graph showing the results of compression tests on a known folded convoluted wafer.
Figure 7:
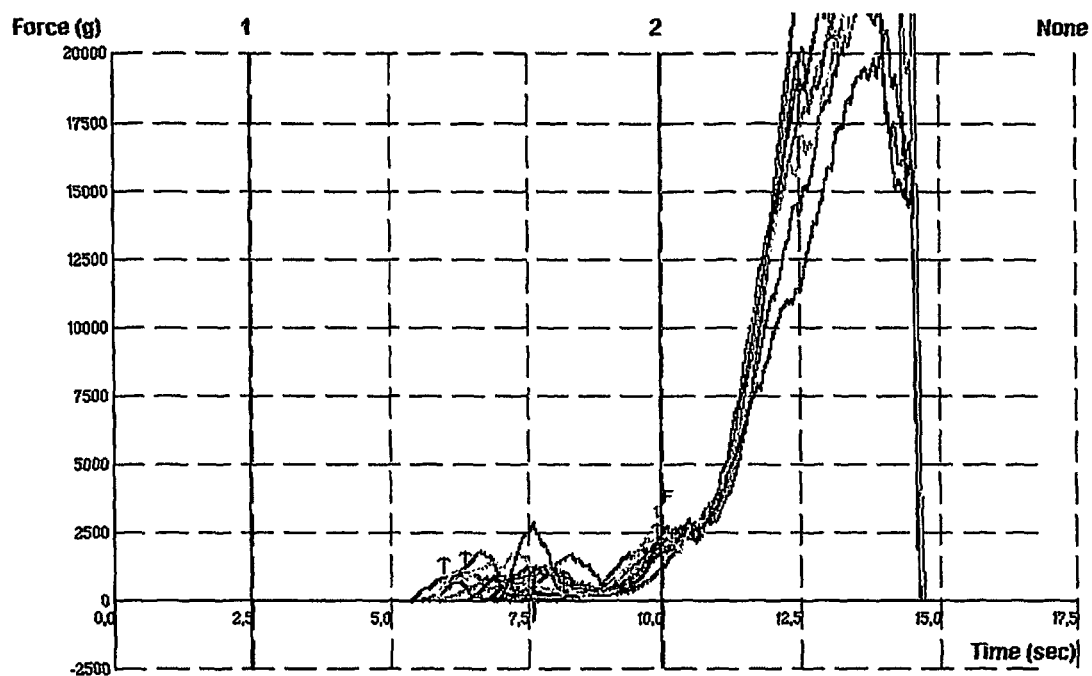
FIG. 7 is a graph showing the results of compression tests on a known flattened rolled wafer.

The apparatus of FIGS. 1 and 2 comprises a roll wafer oven 10 having a heated drum 20 mounted for clockwise rotation about its central axis, as shown by the arrow in FIG. 1. A rotary former 30, having a plurality of cavities 40 disposed about its circumference, is mounted adjacent to the drum 20 for rotation in an anti-clockwise direction about its central axis. A doctor blade 50 is mounted between the drum 20 and the rotary former 30. A take-off belt 60 is located beneath the rotary former 30 on the side distant from the drum 20.

In use, wafer batter is applied to the heated surface of the rotating drum 20 of the roll wafer oven 10. The wafer batter bakes as the drum rotates to form a continuous baked layer of wafer 70 which is removed from the surface of the drum 20 as a continuous ribbon 80 by the doctor blade 50. As the wafer ribbon 80 is removed from the drum 20 it collects in a cavity 40 on the rotary former 30. The continued counter rotation of the drum 20 and the rotary former 30, causes the doctor blade 50 and the divide between the cavity 40 and the adjacent cavity in a clockwise direction to cooperate in a scissor like action, cutting the wafer ribbon 80 to form a discrete rippled wafer 90 in the cavity 40. The wafer ribbon 80 then begins to collect in the adjacent cavity and the process is repeated. The rippled wafers 90 are ejected from the rotary former 30 onto the take-off belt 60 by removal means such as an air jet (not shown) and transported downstream of the rotary former where they may be incorporated into confectionery products by conventional means.

The width of the wafer ribbon 80 formed on the surface drum 20 determines the maximum length of the formed rippled wafers 90, while the length of wafer ribbon 80 collected in each cavity 40 on the rotary former 30 affects the density of convolutions of the rippled wafers 90 and hence their overall density.

For a given width of wafer ribbon 80, the shape of the rippled wafers 90 formed are in part determined by the dimensions of the cavities 40 on the rotary former 30 and the density of the rippled wafers 90 formed are in part determined by the relative speeds of the rotary former 30 and the drum 20, which determine the length of wafer ribbon 80 collected in each cavity 40. For a given cavity size and drum speed, an increase in the rotational speed of the rotary former 30 leads to a decrease in the length of wafer ribbon 80 collected in each cavity 40 and hence to a decrease in the density of the rippled wafers 90 formed. Similarly, for a given cavity size and drum speed, a decrease in the rotational speed of the rotary former 30 leads to a increase in the length of wafer ribbon 80 collected in each cavity 40 and hence to an increase in the density of the rippled wafers 90 formed.

The temperature of and residence time of the rippled wafer within the rotary former should be sufficient to cool the wafer below its glass transition temperature to ensure it maintains its formed shape upon exiting the rotary former. If the rippled wafer is not sufficiently cooled before being removed from the rotary former, it will remain flexible and may expand or relax from its formed shape to its original shape.

Decreasing the amount of wafer introduced into each cavity of the rotary former reduces the density of the rippled wafers produced, resulting in less efficient cooling as the specific heat capacity of the rippled wafers (wafer and air) increases. However, the amount of wafer to be cooled is reduced. Conversely, increasing the amount of wafer introduced into each cavity of the rotary former increases the density of the rippled wafers produced and so results in more efficient cooling. However, the amount of wafer to be cooled is also increased.

The production of rippled wafers according to the invention will now be further described with reference to the following examples:

EXAMPLE 1

The ingredients listed in Table 1 were mixed to form a wafer batter

TABLE 1

| Ingredient | % by weight |
| --- | --- |
| Sucrose | 23 |
| Wheat Flour | 32 |
| GP Fat Hard | 2 |
| Skimmed Milk Powder | 2 |
| Water | 40 |
| Lecithin | 0.4 |
| Cocoa Powder | 0.4 |
| Salt | 0.2 |
| Total | 100.0 |

A continuous layer of the batter was deposited onto the drum surface of a gas heated 2 meter diameter drum oven and baked for 32 seconds at a temperature of between 155° C. and 165° C. to form a flexible wafer layer. Once baked, the hot flexible wafer layer was removed from the surface of the drum as a wafer ribbon by means of a doctor blade and rippled directly into a water-cooled rotary forming unit, indexed by servo-motor control and surrounded by a mains water-cooled jacket. The cavities of the rotary former unit were each approximately 9 mm×9 mm×300 mm. The resulting rippled wafers were cooled to less than 80° C. in the rotary former for about 10 seconds before being blown by an air jet horizontally along the rotary former channel down a hose into a collection channel.

The length, thickness, weight, and density of the rippled wafers obtained in Example 1 are given in Table 2.

EXAMPLES 2 TO 5

Rippled wafers of varying lengths were produced in the same way as in Example 1. The length, thickness, weight, and density of the rippled wafers obtained in Examples 2 to 5 are also given in Table 2.

EXAMPLE 6

Rippled wafers were produced in the same way as in Example 1 using a wafer batter having the ingredients given in Table 1 but in which the skimmed milk powder was replaced by malted milk powder.

EXAMPLE 7

Rippled wafers were produced in the same way as in Example 1 using a wafer batter in which the cocoa powder content was increased from 0.4% by weight to 1.1% by weight.

In Examples 1 to 7 the wafers retained their formed rippled shape upon being removed from the rotary former.

TABLE 2

|  | Example | | | | |
| --- | --- | --- | --- | --- | --- |
|  | 1 | 2 | 3 | 4 | 5 |
| Baking time/s | 32 | 32 | 32 | 32 | 32 |
| Wafer length/mm | 65 | 65 | 58 | 58 | 85 |
| Wafer thickness/mm | 0.6 | 0.6 | 0.5 | 0.5 | 0.55 |
| Wafer weight/g | 2.17 | 2.15 | 1.9 | 1.75 | 2.7 |
| Wafer density/kg/m$^3$ | 412.5 | 408.7 | 405 | 373 | 392.4 |

EXAMPLES 8 TO 13

To assess the effect of wafer density on the hardness and crispiness of rippled wafers according to the invention, rippled wafers of varying density were produced in the same way as in Example 1. The rippled wafer density was modified for a given wafer width by varying the amount of wafer collected in each cavity of the rotary former through variation of the index speed of the rotary former; increasing the index speed leads to decreased rippled wafer density, decreasing the index speed leads to increased rippled wafer density.

Hardness:

The hardness of the rippled wafers produced was measured by a 3-point bend test on a Micro Stable Systems Texture Analyser. The results are given in Table 3 along with those for a typical known cylindrical rolled wafer of the same recipe of Example 1.

As can be seen from Table 3, a force of approximately 10N was required to break the rippled wafer of Example 9, having a weight per unit length of 0.033 kg/m. In contrast, a force of 18N is required to break a typical known cylindrical rolled wafer. Rippled wafers according to the invention, therefore, deliver a different texture to known cylindrical rolled wafers. When comparing wafers of the same weight, the rippled wafers of the invention deliver a lighter bite and have faster melting characteristics than known cylindrical rolled wafers.

TABLE 3

| Example | Weight per unit length/kg/m | Hardness/N |
| --- | --- | --- |
| Rolled Wafer | 0.028 | 18 |
| 8 | 0.050 | 16 |
| 9 | 0.033 | 10 |
| 10 | 0.021 | 8 |

Texture:

The texture of the rippled wafers produced was analysed by a flat disc compression test on a Micro Stable Systems Texture Analyser. The averaged results for a number of individual tests are given in Table 4 along with those for: a known cylindrical rolled wafer; a known folded convoluted wafer and a known flattened rolled wafer all of the recipe of Example 1 and of the same weight per unit length.

The results of each individual compression test for the cylindrical rolled wafer, the folded convoluted wafer, the flattened rolled wafer and the rippled wafers of Examples 11 to 13 are shown graphically in FIGS. 5 to 10, respectively.

The force listed in Table 4 is the force required to initially crush the various wafers as measured by the highest initial peak height in the compression tests and gives as an indication of the hardness of the wafers.

The peak count listed in Table 4 is the number of distinct peaks detected during the flat disc compression tests and gives an indication of the crispness of the wafers.

As can be seen from Table 4, there is some variation in the force required to initially crush the rippled wafers of Examples 11 to 13. In all cases, however, the force required is significantly less than that required to initially crush the known cylindrical rolled wafer; this is a reflection of the relatively hard nature of cylindrical rolled wafers which "snap" when consumed.

TABLE 4

| Example | Length/mm | Weight/g | Weight per unit length/kg/m | Force/N | Peak count |
| --- | --- | --- | --- | --- | --- |
| Rolled wafer | 125 | 7.1 | 0.06 | 70 | 10 |
| Folded convoluted wafer | 96 | 2.7 | 0.03 | 27 | 11 |
| Flattened rolled wafer | 96 | 2.7 | 0.03 | 21 | 3 |
| 11 | 70 | 2.2 | 0.03 | 47 | 21 |
| 12 | 60 | 1.7 | 0.03 | 24 | 15 |
| 13 | 65 | 1.85 | 0.03 | 25 | 17 |

It is clear from these compression tests and the hardness tests previously discussed that confectionery products incorporating cylindrical rolled wafers will not possess the light, crisp texture of confectionery products according to the present invention.

Figure 8:
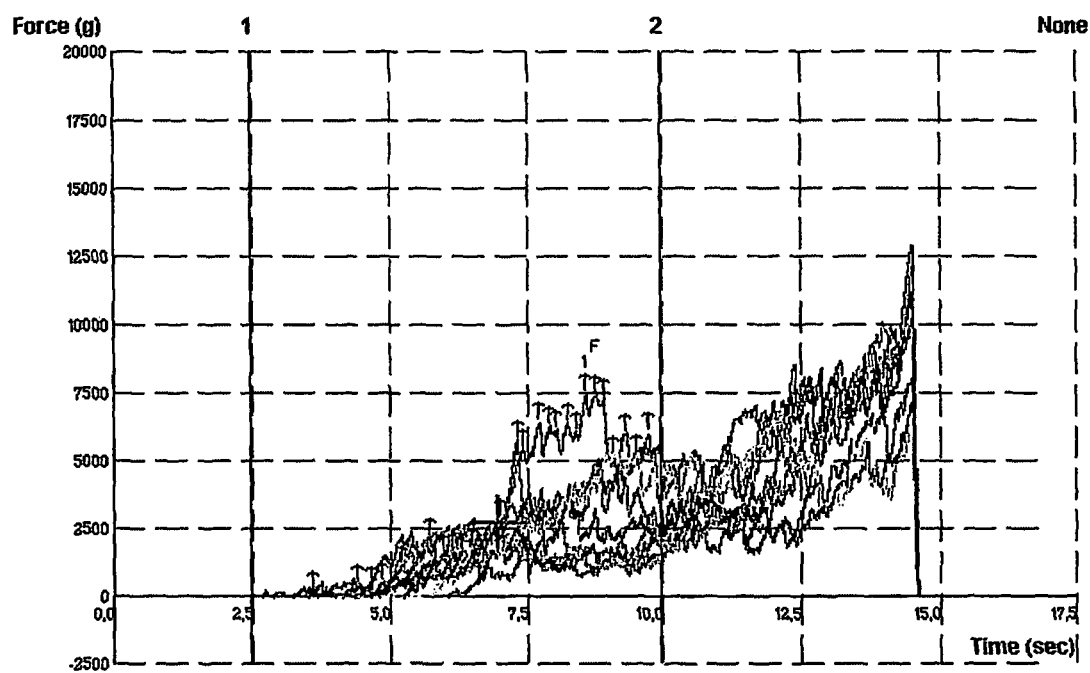
FIG. 8 is a graph showing the results of compression tests on a first rippled wafer of the present invention.
Figure 9:
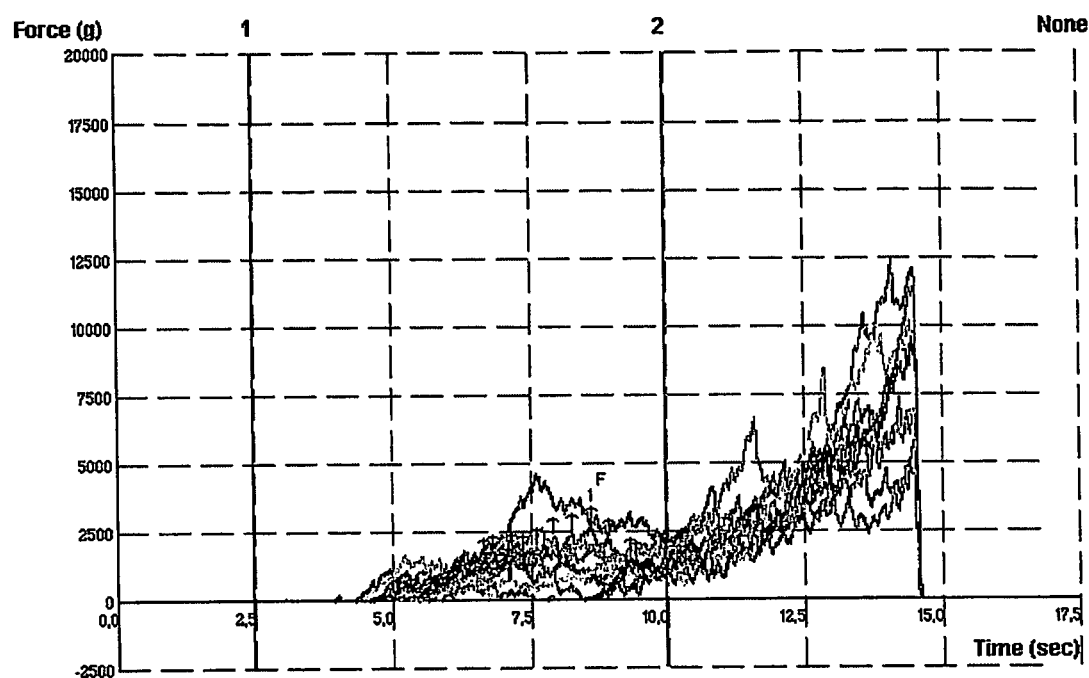
FIG. 9 is a graph showing the results of compression tests on a second rippled wafer of the present invention.
Figure 10:
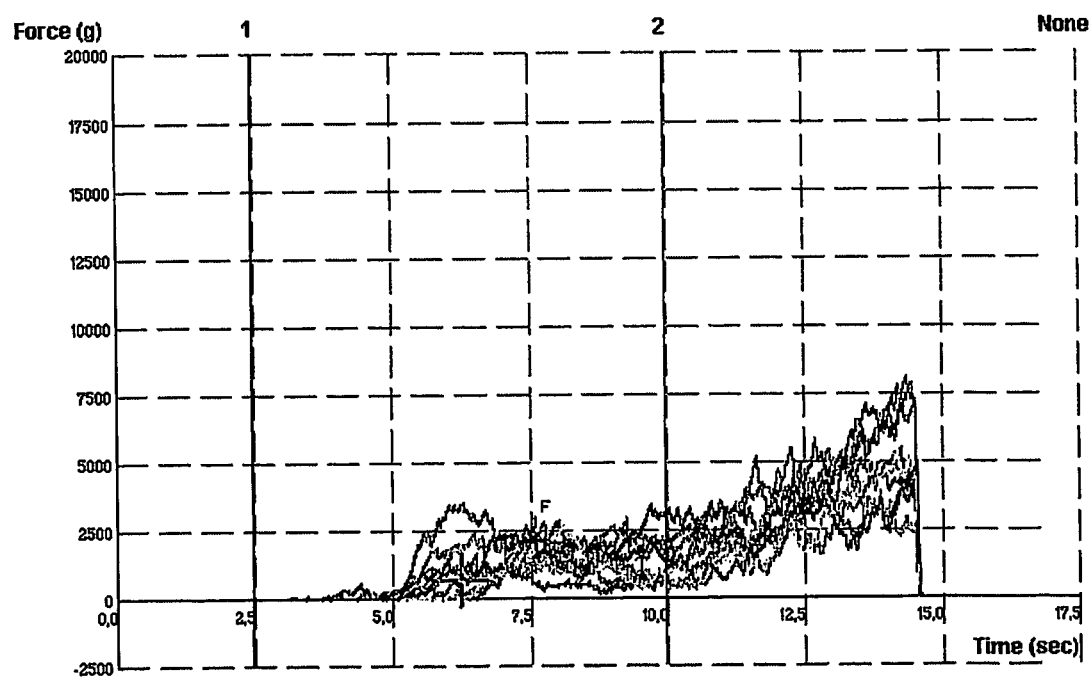
FIG. 10 is a graph showing the results of compression tests on a third rippled wafer of the present invention.

The forces taken to initially crush a known folded convoluted wafer and a known flattened rolled wafer are comparable to those required to crush the rippled wafers of Examples 11 to 13. As can be seen in Table 4 and FIGS. 5 to 10, however, the rippled wafers of the present invention have higher peak counts than all three of the known wafer types. In addition, the peaks for the rippled wafers of Examples 11, 12 and 13 as shown in FIGS. 8 to 10 respectively are more distinct (larger troughs between each peak) than those for the known wafers shown in FIGS. 5 to 7. While known folded convoluted and flattened rolled wafers are not hard and have a delicate texture, they do not exhibit the same level of crispness as the rippled wafers of the present invention. Consequently, confectionery products incorporating such known wafers will not have the same textural attributes as confectionery products according to the present invention.

EXAMPLES 14 TO 16

The number of turns (changes in direction of at least 45°) in the wafer ribbon forming the rippled wafer in ten 25 mm$^2$ portions of the cross section of three rippled wafers produced in the same way as in Example 1 were measured. From these measurements the average number of turns/cm$^2$ was calculated. The results are given in Table 5 along with those for a known folded convoluted wafer

TABLE 5

| Example | 14 | 15 | 16 | Folded convoluted wafer |
|---|---|---|---|---|
| Weight/g | 1.7 | 2.1 | 2.5 | 70 |
| Average number of turns/cm² | 24.8 | 29.2 | 37.2 | 7.6 |

As can be seen from Table 5, while there is some variation in the average number of turns/cm² of the rippled wafers of Examples 14 to 16, in all cases the average number of turns is much greater than for the known folded convoluted wafer.

The average number of turns for a given cross sectional area, like the cross sectional edge length, gives an indication of the degree of convolution and the crispness of the formed wafer. As discussed above, while known folded convoluted wafers are not hard and have a delicate texture, they do not exhibit the same level of convolution and crispness as the rippled wafers of the present invention.

Figure 11:
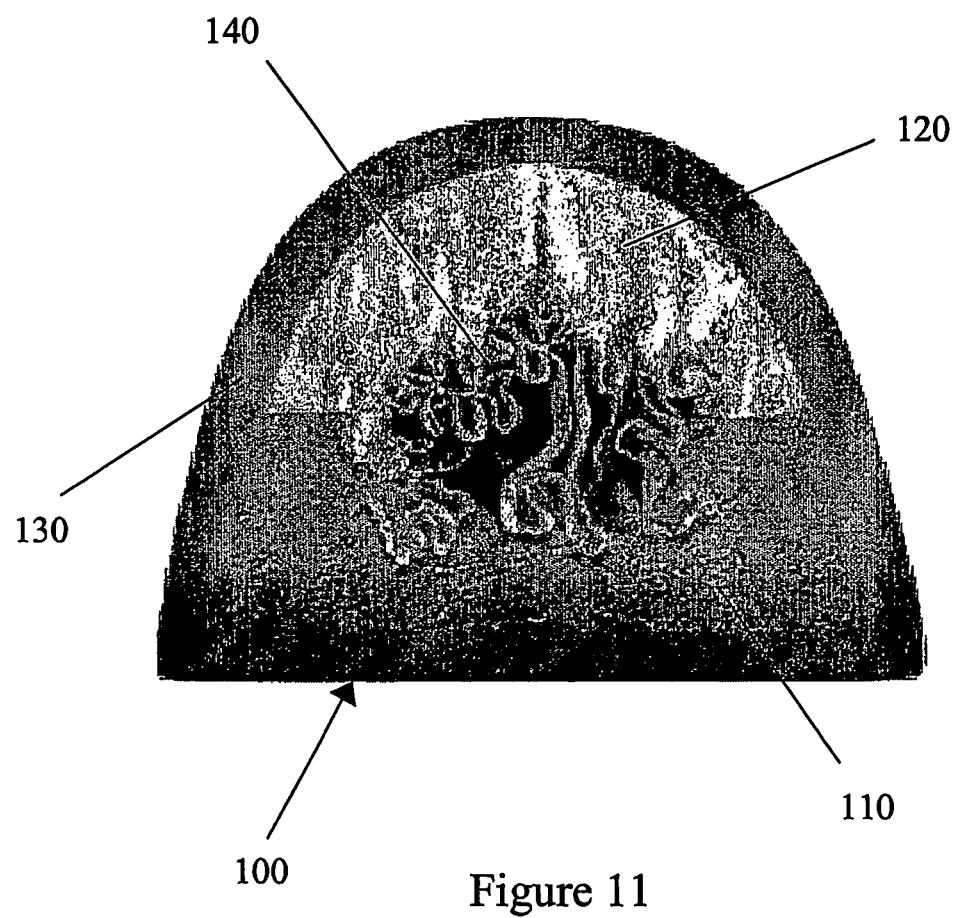
FIG. 11 shows a cross-sectional view of an embodiment of a confectionery product according to the invention.

FIG. 11 shows an embodiment of a layered confectionery product 100 according to the present invention comprising a lower chocolate cream layer 110 and an upper caramel layer 120 on top of the chocolate cream layer 110. The lower chocolate cream layer 110 and the upper caramel cream layer 120 are covered by an outer layer of chocolate 130. A rippled wafer 140 is disposed at the interface between the lower chocolate cream layer 110 and the upper caramel cream layer 120 such that the upper surface of the rippled wafer 140 is surrounded by the caramel cream layer 120 and the lower surface of the rippled wafer 140 is surrounded by the chocolate cream layer 110. The rippled wafer 140 delivers a light, crisp and even texture to the confectionery product 100.

While in the examples described above, the rippled wafers of the invention were formed using a gas heated roll wafer oven, it will be appreciated that other ovens such as infra-red or induction heated ovens could also be employed.

In the examples described, the means for ejecting the rippled wafers from the rotary former comprise an air jet, other removal means including suction means, gravitational means or physical means such as rod pushers could be employed.

In order to deliver different flavours and/or textural attributes, different sugars and/or base recipes may be employed in the manufacture of rippled wafers according to the invention to produce sweet or savoury wafers.

Rippled wafers to which inclusions or other product layers have been added during the baking process may be included in confectionery products according to the invention. Rippled wafers according to the invention may also be incorporated as components in other products such as petfoods.

The invention claimed is:

1. A baked flour-based rippled wafer comprising a plurality of non-concentric convolutions of a convoluted baked flour-based wafer ribbon, the baked flour-based rippled wafer having an average of at least 12 turns/cm2 of cross sectional area, wherein a turn is a change in direction of the convoluted baked flour-based wafer ribbon of at least 45°, wherein the cross sectional area is equal to a volume of the baked flour-based rippled wafer divided by a length of the baked flour-based rippled wafer.

2. A baked flour-based rippled wafer according to claim 1 having an average of at least 15 turns/cm 2.

3. A baked flour-based rippled wafer according to claim 1 having an average of at least 20 turns/cm2.

4. A baked flour-based rippled wafer according to claim 1 having an average of at least 25 turns/cm 2.

5. A baked flour-based rippled wafer according to claim 1, wherein a turn is a change in direction of the wafer ribbon of at least 90°.

6. A baked flour-based rippled wafer according to claim 1, wherein a turn is a change in direction of the wafer ribbon of at least 135°.

7. A baked flour-based rippled wafer according to claim 1, having a ratio of cross sectional edge length-to average cross sectional area of greater than $2/r_e$, wherein $r_e$ equals (average cross sectional area/$\pi$)$^{1/2}$.

8. A baked flour-based rippled wafer according to claim 1, having a ratio of cross sectional edge length to average cross sectional area of at least $4/r_e$, wherein $r_e$ equals (average cross sectional area/$\pi$)$^{1/2}$.

9. A confectionery product comprising a baked flour-based rippled wafer comprising a plurality of non-concentric convolutions of a convoluted baked flour-based wafer ribbon, the baked flour-based rippled wafer having an average of at least 12 turns/cm2 of cross sectional area, wherein the turns are substantially uniformly distributed across the cross section of the rippled wafer, where a turn is a change in direction of the convoluted baked flour-based wafer ribbon of at least 45°, wherein the cross sectional area is equal to a volume of the baked flour-based rippled wafer divided by a length of the baked flour-based rippled wafer.

10. A confectionery product according to claim 9, comprising a three-dimensional rippled wafer formed in a single step.

11. A confectionery product according to claim 9, having a ratio of cross sectional edge length-to average cross sectional area of greater than $2/r_e$, wherein $r_e$ equals (average cross sectional area/$\pi$)$^{1/2}$.

12. A confectionery product according to claim 9, having a ratio of cross sectional edge length to average cross sectional area of at least $4/r_e$, wherein $r_e$ equals (average cross sectional area/$\pi$)$^{1/2}$.

13. A confectionery product according to claim 9, wherein the baked flour-based rippled wafer has an average of at least 14 turns/cm2.

14. A confectionery product according to claim 9, wherein the baked flour-based rippled wafer has an average of at least 20 turns/cm2.

15. A confectionery product according to claim 9, wherein the baked flour-based rippled wafer has an average of at least 25 turns/cm2.

16. A confectionery product according to claim 9, wherein a turn is a change in direction of the convoluted baked flour-based wafer ribbon of at least 90°.

17. A confectionery product according to claim 9, wherein a turn is a change in direction of the convoluted baked flour-based wafer ribbon of at least 135°.

18. A confectionery product according to claim 9, further comprising a soft layer at least partly surrounding the rippled wafer and a hard shell.

19. A confectionery product according to claim 18 wherein the soft layer is a fat-based cream.

20. A confectionery product according to claim 18, wherein the hard shell is chocolate.

21. A moulded confectionery product according to claim 9.

22. A confectionary product comprising the baked flour-based rippled wafer according to claim 1.

* * * * *

UNITED STATES PATENT AND TRADEMARK OFFICE
CERTIFICATE OF CORRECTION

PATENT NO.        : 8,613,966 B2                                                Page 1 of 1
APPLICATION NO.   : 10/541302
DATED             : December 24, 2013
INVENTOR(S)       : Moppett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1934 days.

Signed and Sealed this
Twenty-second Day of September, 2015

Michelle K. Lee
*Director of the United States Patent and Trademark Office*